US010681001B2

(12) United States Patent
Tang et al.

(10) Patent No.: US 10,681,001 B2
(45) Date of Patent: Jun. 9, 2020

(54) HIGH PRECISION MAPPING WITH INTERMEDIARY DNS FILTERING

(71) Applicant: Akamai Technologies, Inc., Cambridge, MA (US)

(72) Inventors: David Tang, Medford, MA (US); Charles E. Gero, Quincy, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/993,774

(22) Filed: May 31, 2018

(65) Prior Publication Data
US 2019/0306111 A1 Oct. 3, 2019

Related U.S. Application Data

(60) Provisional application No. 62/650,193, filed on Mar. 29, 2018.

(51) Int. Cl.
G06F 15/177 (2006.01)
H04L 29/12 (2006.01)
H04L 12/24 (2006.01)
H04L 12/26 (2006.01)
H04L 29/08 (2006.01)

(52) U.S. Cl.
CPC ...... *H04L 61/1511* (2013.01); *H04L 41/0813* (2013.01); *H04L 43/0864* (2013.01); *H04L 61/2007* (2013.01); *H04L 67/02* (2013.01); *H04L 67/2842* (2013.01)

(58) Field of Classification Search
CPC ............ H04L 61/1511; H04L 41/0813; H04L 43/0864; H04L 61/2007; H04L 67/02; H04L 67/2842
See application file for complete search history.

(56) References Cited

U.S. PATENT DOCUMENTS

| 6,108,703 | A  | 8/2000  | Leighton et al. |
| 6,154,777 | A  | 11/2000 | Ebrahim         |
| 6,182,139 | B1 | 1/2001  | Brendel et al.  |
| 6,405,252 | B1 | 6/2002  | Gupta et al.    |
| 6,484,143 | B1 | 11/2002 | Swildens et al. |
| 6,487,678 | B1 | 11/2002 | Briskey et al.  |

(Continued)

OTHER PUBLICATIONS

Contavalli, C. et al., "Client Subnet in DNS Queries", IETF RFC 7871, May 2016, 32 pages.

*Primary Examiner* — Ryan J Jakovac

(57) ABSTRACT

Among other things, this document describes systems, devices, and methods for improving the mapping of end user clients to content servers. In one embodiment, an intermediary DNS server receives a DNS answer with multiple IP addresses. The intermediary DNS server modifies this answer before passing it on to the end user client—that is the end user client that originally requested name resolution of the hostname. Modification can involve filtering the list to remove low-performing IP addresses, re-ordering the list, blocking certain IPs according to policy, or other things. The intermediary DNS server can be operated by a internet service provider (carrier) or an enterprise, for example, or provided on their behalf by a third party as a service. The modification can be based on knowledge of the client-side network, including the location and connectivity of the end user client.

6 Claims, 9 Drawing Sheets

(56) References Cited

U.S. PATENT DOCUMENTS

| | | |
|---|---|---|
| 6,513,061 B1 | 1/2003 | Ebata et al. |
| 6,553,413 B1 | 4/2003 | Leighton et al. |
| 6,694,358 B1 | 2/2004 | Swildens et al. |
| 6,754,699 B2 | 6/2004 | Swildens et al. |
| 6,820,133 B1 | 11/2004 | Grove et al. |
| 7,010,598 B2 | 3/2006 | Sitaraman et al. |
| 7,096,263 B2 | 8/2006 | Leighton et al. |
| 7,111,057 B1 | 9/2006 | Wein et al. |
| 7,165,116 B2 | 1/2007 | Grove et al. |
| 7,181,653 B2 | 2/2007 | Challener et al. |
| 7,240,100 B1 | 7/2007 | Wein et al. |
| 7,251,688 B2 | 7/2007 | Leighton et al. |
| 7,274,658 B2 | 9/2007 | Bornstein et al. |
| 7,296,082 B2 | 11/2007 | Leighton et al. |
| 7,299,291 B1 | 11/2007 | Shaw |
| 7,376,716 B2 | 5/2008 | Dilley et al. |
| 7,454,500 B1 * | 11/2008 | Hsu .................... H04L 67/1008 709/203 |
| 7,472,178 B2 | 12/2008 | Lisiecki et al. |
| 7,587,624 B1 | 9/2009 | Weber |
| 7,600,025 B2 | 10/2009 | Lewin et al. |
| 7,660,296 B2 | 2/2010 | Fletcher et al. |
| 7,698,458 B1 | 4/2010 | Liu et al. |
| 7,996,531 B2 | 8/2011 | Freedman |
| 8,578,052 B1 | 11/2013 | Liu et al. |
| 8,707,429 B2 | 4/2014 | Wilbourn et al. |
| 8,832,283 B1 | 9/2014 | Roskind et al. |
| 9,191,393 B2 | 11/2015 | Tovar |
| 9,270,684 B2 | 2/2016 | Ashley et al. |
| 9,742,811 B2 | 8/2017 | Lemon et al. |
| 9,954,816 B2 | 4/2018 | Halley et al. |
| 9,992,234 B2 | 6/2018 | Lemon et al. |
| 10,079,800 B2 | 9/2018 | Halley et al. |
| 10,122,677 B2 | 11/2018 | Halley et al. |
| 10,263,958 B2 | 4/2019 | Bremen et al. |
| 2006/0031393 A1 | 2/2006 | Cooney et al. |
| 2006/0039352 A1 | 2/2006 | Karstens |
| 2006/0098645 A1 | 5/2006 | Walkin |
| 2006/0176822 A1 | 8/2006 | Doyle et al. |
| 2007/0041386 A1 | 2/2007 | Mar et al. |
| 2009/0019181 A1 | 1/2009 | Fang et al. |
| 2011/0173345 A1 | 7/2011 | Knox et al. |
| 2014/0189069 A1 | 7/2014 | Gero et al. |
| 2015/0288721 A1 | 10/2015 | Lemon et al. |
| 2017/0111309 A1 | 4/2017 | Halley et al. |
| 2017/0126616 A1 | 5/2017 | Halley et al. |

* cited by examiner

FIG. 2 (Prior Art - No CNAME)

FIG. 4 (No CNAME)

HIGH PRECISION MAPPING WITH INTERMEDIARY DNS FILTERING

BACKGROUND

Technical Field

This document relates generally to system and methods for improving the mapping of end user clients to content servers.

Brief Description of the Related Art

DNS is commonly used as a method for mapping clients to a targeted set of IPs in use-cases within Content Delivery Networks (CDNs), Software as a Service (SaaS), Infrastructure as a Service (IaaS), and many other Internet-based distributed systems. (See, in this regard, the section entitled "Content Delivery Networks" at the end of this specification.) In DNS mapping systems, end user clients typically make a request to resolve a domain name to a recursive DNS server that is typically provided by their ISP or an enterprise (sometimes referred to as a local DNS server or caching DNS server). The end user client's recursive DNS (which is sometimes referred to as the DNS client) then contacts an authoritative name server for the domain, which returns an answer—or a CNAME to an another domain name that ultimately is resolved to an answer (also referred to herein as the DNS response). The DNS answer is a set of IP addresses for content servers that are valid for fetching the content hosted under the domain name and that are most suitable for the end user client at the given time. The authoritative name server may use the IP address of the recursive DNS server to determine which content server is closest to the end user client. The authoritative DNS server may also be able to use the end user client's source CIDR to determine which content server is closest to the client. This latter capability is enabled by, for example, the EDNS0 mechanism described in IETF RFC 7871, which provides a way for recursive DNS servers to attach end user client IP address information to its DNS query upstream to the authoritative DNS.

Some mapping systems are able to prune the list of IP addresses down to a few servers that are almost equally distanced from the end user client, while other mapping systems take a more best effort approach of returning a set of IP addresses for all servers within a geographic region or country. In cases where a domain is not fronted by a DNS-based mapping system, the authoritative DNS server may simply answer back with all or a random set of IP addresses capable of serving that domain.

The performance of each IP address in the DNS is not the same. The difference between the performance will vary with the sophistication of the mapping system and the accuracy of its input data. Put another way, the latency that an end user client sees from across IP addresses may vary widely (high variance) in systems with poor or no mapping. The result is that the performance can vary widely based on which IP address the end user client device (in particular, a browser or other client application) decides to use. For example, if an end user client on the East Coast USA gets a DNS answer with IP addresses for content servers on both the East and West Coast USA, and it happens to choose the West Coast IP address, the latency could be around 75 milliseconds (ms) longer than if only an East Coast content server was returned.

If a sub-optimal set of DNS answers is returned from the authoritative DNS server in response to a DNS query, intermediate DNS servers just pass the answer set back down to the end user client device, unmodified. Thus, on the end user client device, user-space applications receive a list of content server IP addresses back from the operating system without any meta-information, such as latency. Applications must then choose an IP address from the list; they might do so by choosing at random, or as is typical in Linux, applications use the hostent->h_addr field which is an alias for host->h_addr_list[0]; i.e., the first entry in the list. Neither of these approaches are necessarily designed to select based on performance.

The teachings hereof address the technical problems identified above (and others that will become apparent based hereon) by providing systems and methods and system for improving DNS resolution and mapping, and thereby improving the performance of network resources seen by the end user client. Hence they represent improvements to the operation of computer networks, distributed computing system, and client-server technologies.

With the foregoing by way of introduction, the teachings hereof are now provided in detail.

BRIEF SUMMARY

Among other things, this document describes systems, devices, and methods for improving the mapping of end user clients to content servers. In one embodiment, an intermediary DNS server receives a DNS answer with multiple IP addresses from which content hosted under a given hostname might be requested. The intermediary DNS server modifies this answer before passing it on to the end user client—that is the end user client that originally requested name resolution of the hostname. Modification can involve filtering the list to remove low-performing IP addresses, re-ordering the list, blocking certain IPs according to policy, or other things. The intermediary DNS server can be operated by a internet service provider (carrier) or an enterprise, for example, or provided on their behalf by a third party as a service. The modification can be based on knowledge of the client-side network, including the location and connectivity of the end user client.

The ability to apply policy to DNS answers at an intermediary DNS server enables an ISP, an enterprise, or other "client-side entity" with a powerful ability to modify DNS responses headed towards its end user clients. This is particularly (but not exclusively) useful where the client side entity operates a distributed infrastructure, such that the authoritative DNS server poorly maps the end user client to a supposedly nearby content server. This often occurs because the network distance is large between the end user client and the client-side entity's recursive DNS server that queries the authoritative DNS on behalf of the end user client, which essentially misleads the authoritative DNS as to the location of the end-user client.

It should be noted that a policy can specify on a hostname by hostname basis (or subdomain by subdomain basis) whether any modification should occur. Put another way, a client side entity may desire to apply the teachings hereof only to certain websites.

In many embodiments, the intermediary DNS server functionality can be implemented within the recursive DNS server operated by the client-side entity (sometimes referred to as a local DNS server or DNS resolver). The teachings hereof may be implemented by client side entity regardless of whether the authoritative DNS server even performs intelligent mapping and/or is part of a content delivery network (CDN).

The foregoing is a description of certain aspects of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

Figure 1:
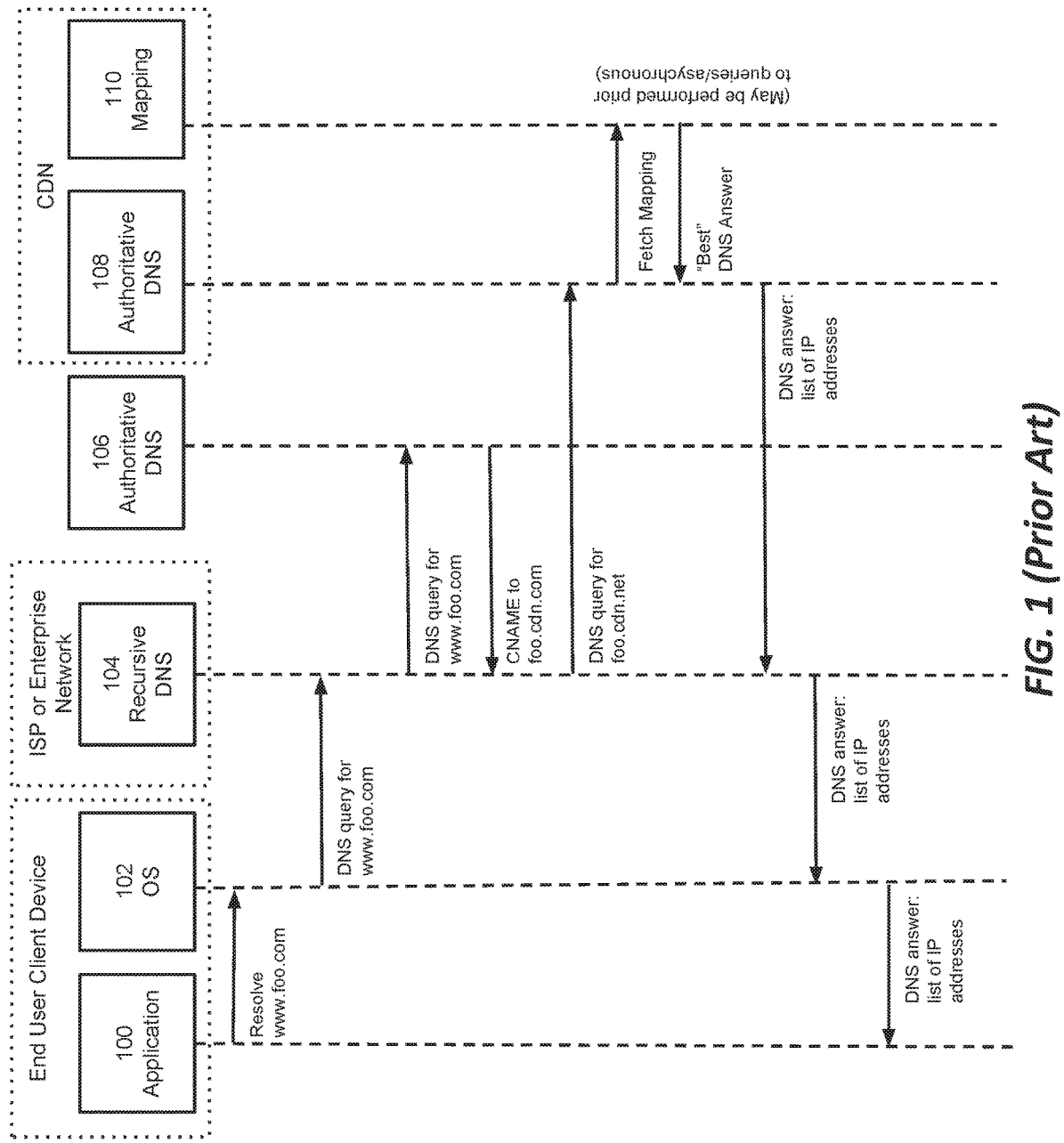
FIG. 1 illustrates a prior art DNS lookup with a CNAME.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document. The terms 'object' and 'resource' are used interchangeably in this patent document. The terms 'domain name' and 'hostname' are used interchangeably in this patent document.

DNS Query Response Modification Methods

There are variety of methods that can be performed by an intermediate DNS server to enhance the DNS answer given to the end user client, or to a downstream DNS resolver, or even to a downstream application. At the outset, it should be understood that the intermediate DNS server could be the recursive/local DNS server referred to above. Generalizing, however, and with reference to FIGS. 1 and 2, the filtering component and filtering methods could reside in recursive DNS server 104, in the Operating System DNS resolver function 102, or in some other intermediate DNS server (not shown) between 102 and 104 or between 104 and 108.

Furthermore, it should be understood that the intermediary DNS server could be a DNS forwarder, proxy, or stub resolver. This means that the recursive DNS server 104 shown in the Figures could be changed, in accordance with the teachings hereof, to be a DNS forwarder, proxy, or stub resolver, with the actions performed by DNS server 104 likewise performed by any of the foregoing alternates.

For ease of description, in this document, the DNS server implementing the filtering will be referred to generically as the "intermediate" DNS server or "intermediate" DNS resolver.

In one embodiment, on an intermediate DNS server, a response to a DNS query is received with a list of IP addresses a particular domain. Instead of forwarding the original list to the end user client or otherwise downstream, the intermediate DNS server can modify the list of IP addresses in the DNS response, based on some metrics (or other information) it has collected on the IP addresses within the set. The modified list is then sent downstream as the DNS response.

Figure 2:
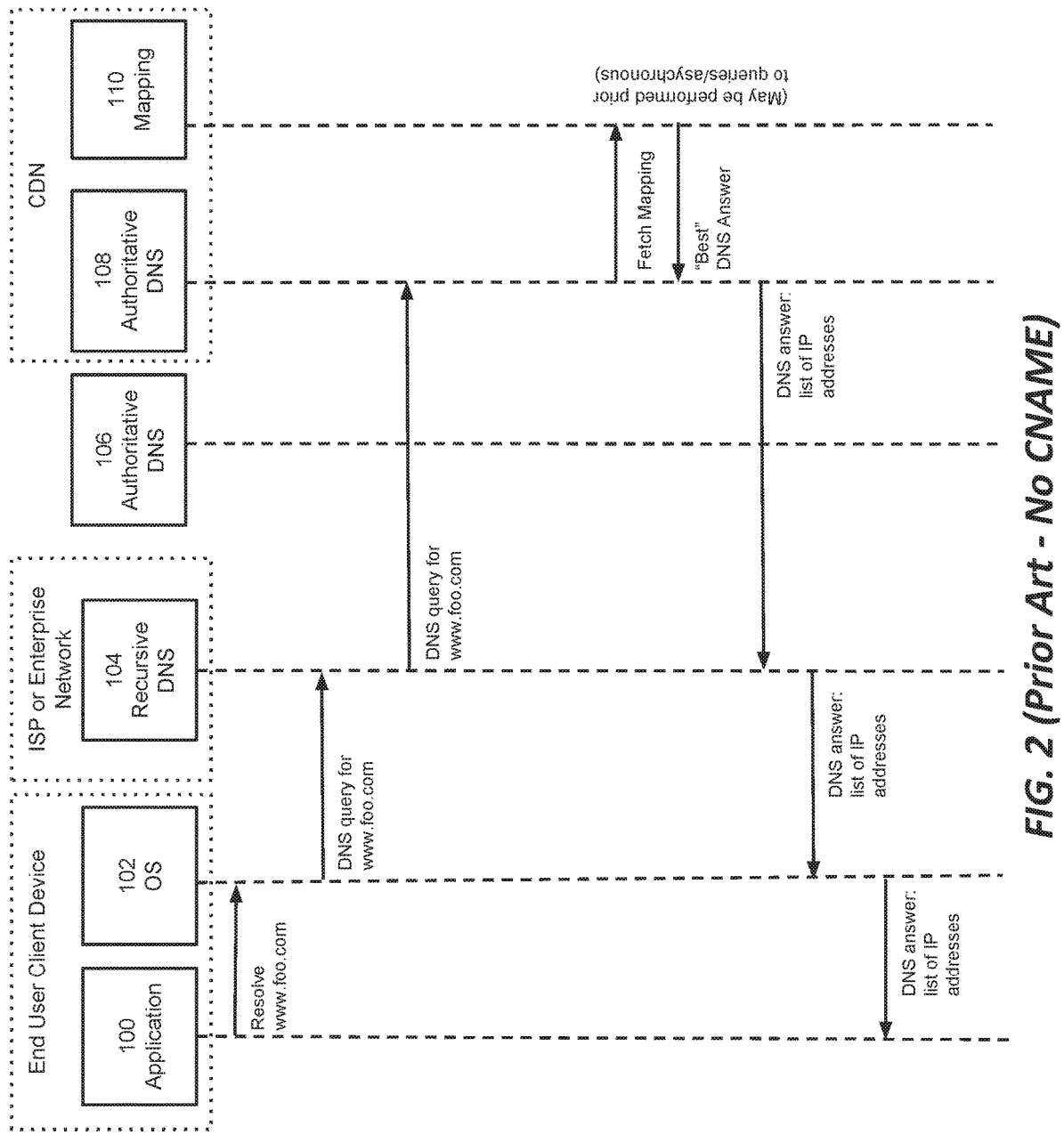
FIG. 2 illustrates a prior art DNS lookup without a CNAME.
Figure 3:
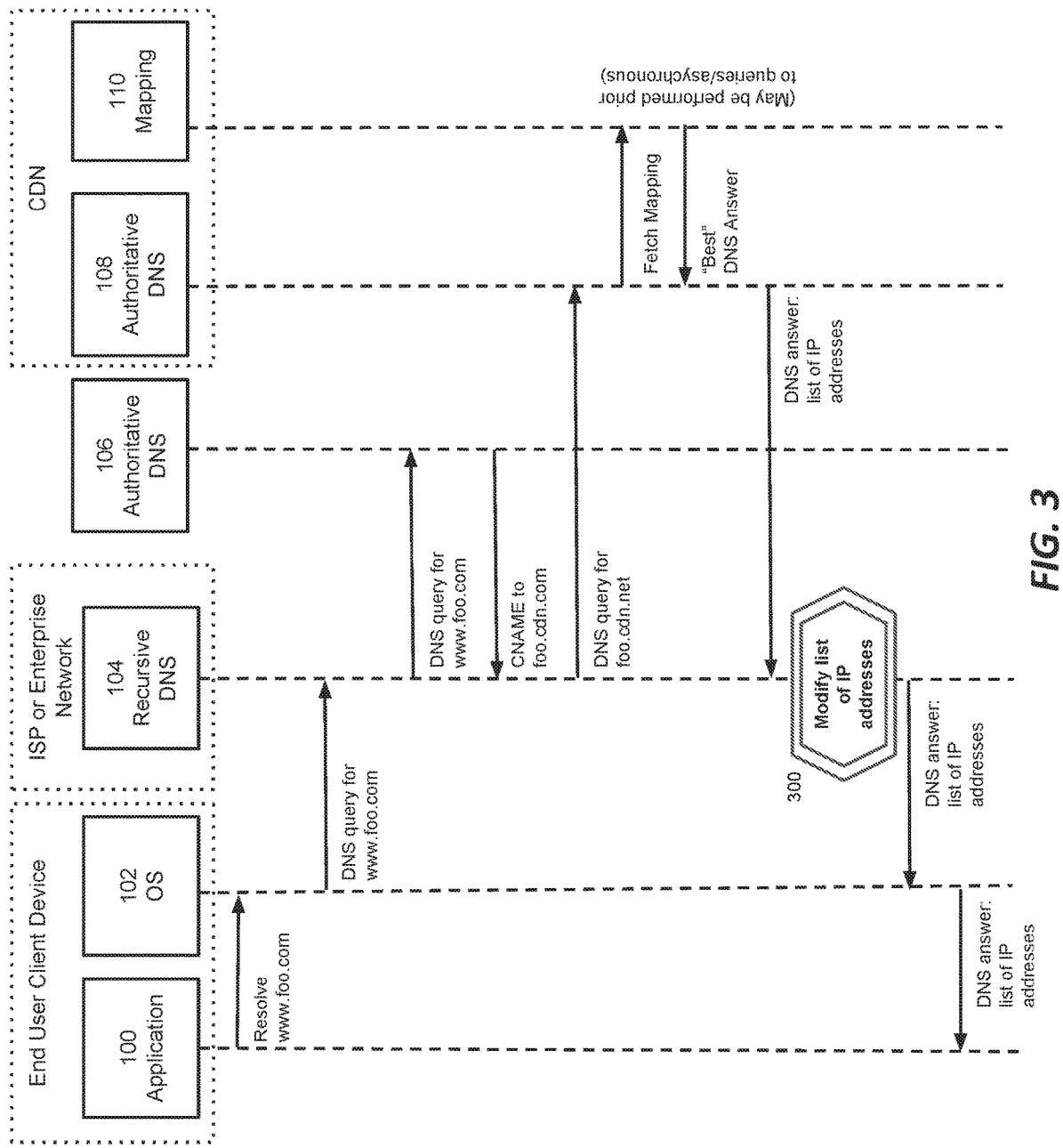
FIG. 3 illustrates the FIG. 1 scenario with modification of DNS responses at an intermediate server, in accord with the teachings hereof.
Figure 4:
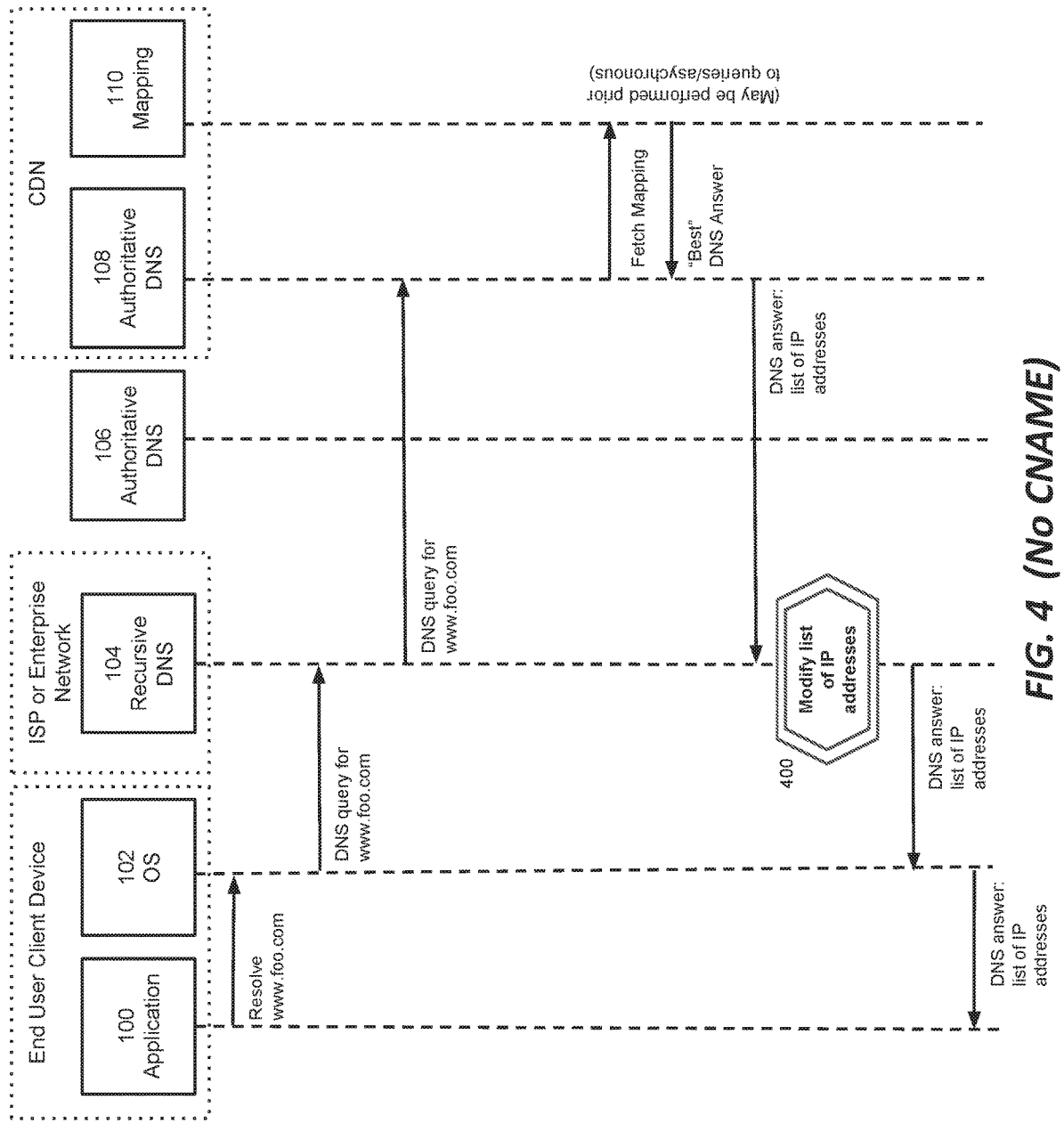
FIG. 4 illustrates the FIG. 2 scenario with modification of DNS responses at an intermediate server, in accord with the teachings hereof.
Figure 5:
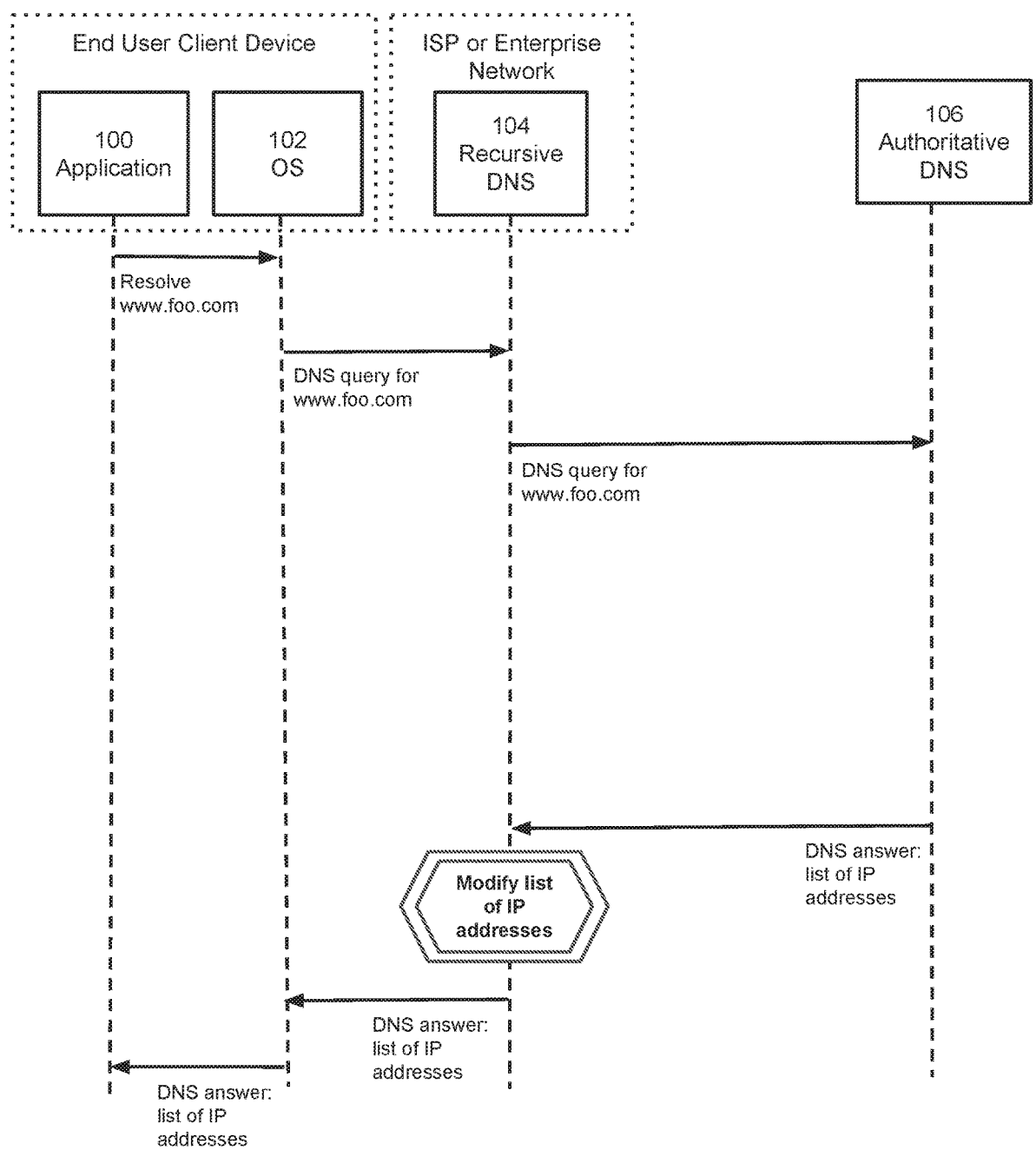
FIG. 5 illustrates the FIG. 2 scenario with modification of DNS responses at an intermediate server, but with no CDN present, in accord with the teachings hereof.

FIGS. 1 and 2 represent prior art approaches, FIGS. 3 and 4 represent modifications to those approaches in accordance with the teachings hereof. With respect to the sequence of FIG. 1, the act of modification is performed by the DNS server 104 on the downstream response; this is shown by the box 300 in FIG. 3. With respect to the sequence of FIG. 2, the act of modification is performed by the DNS server 104 on the downstream response; this is shown by the box 400 in FIG. 4. FIG. 5 differs from FIG. 4 in that the CDN is not utilized, which represents another embodiment.

The IP address list may be modified in a wide variety of ways. For example, one or more IP addresses can be removed from the list (filtering), or one or more IP addresses can be re-ordered in the list, or one or more substitute IP addresses can be substituted for an IP address on the list. More details on these various kinds of modification are now provided DNS Response Filtering In one embodiment, using metrics on performance the intermediate DNS server can remove (filter) sub-optimal answers from the DNS response to ensure the end user client receives just the set of optimal content server IP addresses. "Optimal" in this case is a relative term meaning the better or best amongst the IP addresses in the list. Using this technique, a client side entity or other operator of the intermediate DNS server can provide enhanced mapping for end user clients to third-party domains that the DNS service provider is not authoritative for.

An example of a metric that the intermediate DNS server can use to make filtering decisions is latency or round-trip-time (RTT). This metric refers to the network latencies, also referred to as RTTs, between the end user client location (or approximation thereof) and each of the IP addresses for the content servers in the DNS response. This can be, for example, a measurement based on a protocol such as ICMP, TCP, or otherwise. Obtaining exact RTT measurements from the end user client's location is difficult without having some application or daemon running at the end user client's Internet egress point (See ping proxy description, below.) As such, an assumption that the end user client is close to the recursive DNS resolver (close to 104 in FIGS. 1 and 2) is used as part of a model where "If the RTT between the recursive DNS resolver to Content Server A is less than the RTT from the DNS resolver to Content Server B minus some threshold T, then the client must also be closer to Content Server A than it is to Content Server B, since the end user client client is near the recursive DNS resolver".

Use of a tunable threshold T is preferred so as to reduce false positives where a content server is further from the recursive DNS resolver 104 but closer to the end user client 100/102. For example, see the diagram shown in FIG. 5.

Figure 6:
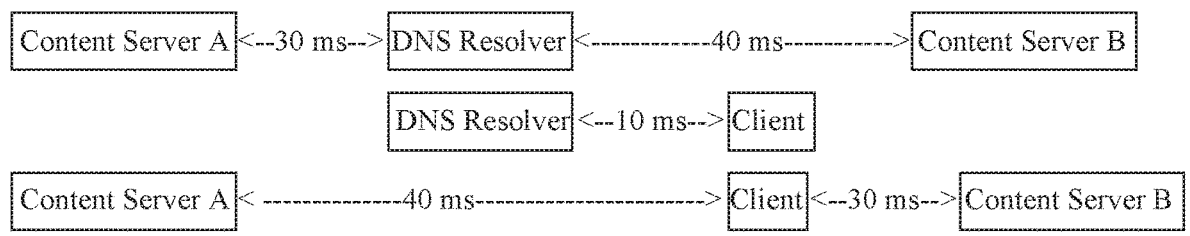
FIG. 6 is a diagram illustrating network distances between selected components, in one example.

In this case shown in FIG. 6, Content Server A is closer to the DNS resolver, but Content Server B is closer to the end user client. Applying a threshold will help suppress incorrect mapping decisions. As the RTT between end user clients and content servers get longer and as the RTT between client and DNS resolver shortens, the accuracy of the mapping decisions improves.

Figure 7:
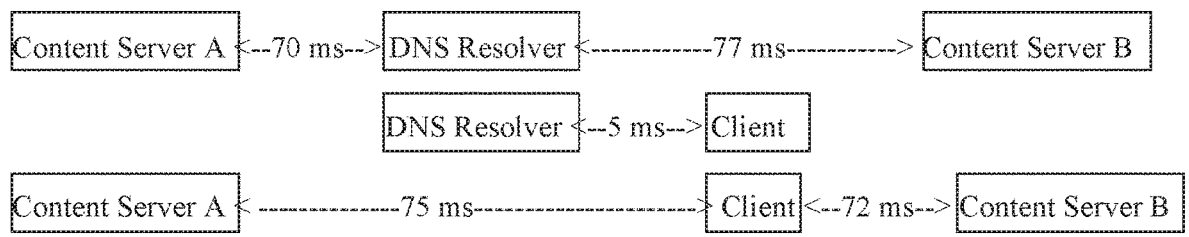
FIG. 7 is a diagram illustrating network distances between selected components, in one example.

In some cases, the intermediate DNS server (which again, is preferably the recursive DNS resolver 104) may not be able to correctly identify which content server is closest but the deviation between either choice of content server is negligible. This is observed in FIG. 7.

If the chosen threshold T were 5 milliseconds, or the RTT between the DNS resolver and end user client, the DNS resolver would choose Content Server A instead of Content Server B even though Content Server B is closer to the end user client. However, the difference in user-experience for an end user client using a content server with latency of 75 ms instead of 72 ms should be negligible.

As noted above, DNS query response filtering calls for removal of the relatively sub-optimal content server IP addresses from the answer list in the DNS answer that is headed back to the end user client. As such, deciding which content server has the lowest RTT is less important than identifying and removing servers that would not be ideal for a client to connect to, which is accomplished by simply removing low-performance IP addresses (rather than trying to sort the list or otherwise prioritize so that the highest performing IP address is at top).

Some data is now provided to illustrate how IP addresses returned in a DNS response can vary in performance and thus the potential effect of the above teachings. In measuring RTT times between an end user client and all of the IP addresses returned from a given DNS query to a common SaaS domain, we observed a wide range of latency characteristics. The answers were not sorted by latency per the teachings hereof. Thus, the browser in effect randomly chooses a content server to connect to and suffers in both TCP and TLS connection establishment time if a sub-optimal content server was chosen. Below are some measurements observed from an end user client to each of the SaaS IP addresses (addresses are obfuscated for privacy and in accord with reserved IP addresses for documentation per IETF RFC 5737):

TABLE 1

| IP Address | Round-Trip Time |
|---|---|
| 192.0.2.0 | 49 ms |
| 192.0.2.10 | 80 ms |
| 192.0.2.20 | 54 ms |
| 192.0.2.100 | 17 ms |
| 192.0.2.200 | 17 ms |
| 192.0.2.255 | 81 ms |

In this example, IP addresses 192.0.2.0, 192.0.2.10, 192.0.2.20, 192.0.2.255 are removed from the DNS query response sent back to the end user client. The end user client only sees 192.0.2.100 and 192.0.2.200 in the response, ensuring that it does not try to connect to a content server 63 ms further away than the closest content server.

It should be understood that the filtering techniques being discussed above relate to removing IP addresses that are valid and responsive, and hence presumably the content servers reachable at those IP addresses could serve content to the end user client device, but they are less performant than other choices. Removal of unresponsive IP addresses is a distinct technique that is described in the section below.

Other Embodiments

Filtering Based on Liveness

Instead of filtering DNS query responses based on a performance metric, another embodiment calls for filtering out IP addresses that fail liveness checks. The liveness check could exist as checks to see if the content server is responsive or detecting when a BGP peering session goes down. Preferably, the liveness check is performed remotely from the content server, such as a periodic test ping sent to the content server IP addresses. This variation provides a more responsive way to ensure uptime of a web site or other digital property compared to the existing methods such as updating authoritative DNS records to remove the problem IP addresses out of circulation or forcing the content server to publish lists of good IP addresses.

Sorting IP Addresses in DNS Query Response

As already mentioned, there are variety of ways to modify the DNS response in accord with the teachings hereof. In one embodiment, IP addresses in the DNS answer list are sorted instead of filtered. This approach provides a slightly more transparent behavior in that answers are not hidden from the end user client. At the same time, the sorted answer list leverages the fact that many applications consuming DNS responses will choose the first IP address in the list.

Ping Proxy

As described earlier, applying latency measurements based on the location of the DNS resolver instead of the end user client introduces a degree of error when analyzing the data. One variation of the methods described above is to obtain latency measurements is to install a ping proxy daemon on the end user client side, as close to the end user client as possible. Preferably the daemon is light weight. The location could be the branch office, ISP head-end, or end user client egress point, or other client-entity ping point. The ping proxy can perform latency measurements to content server IP addresses on behalf of a trusted controller, such as an intermediary DNS resolver. The intermediary DNS resolver can use the information to provide enhanced mapping via DNS query responses as described herein. Generalizing, the intermediate DNS can intake end-user client-side information consisting of performance from the end-user's network location or approximation thereof, and then use this information to filter or otherwise modify the list of IP addresses in an DNS response.

Note that the ping proxy could also be implemented and deployed as a standalone hardware device.

In one embodiment, the ping proxy technique described above can be leveraged by entities that do not wish to append client subnet (EDNS0) information upstream to authoritative DNS servers. For example, an enterprise running an intermediary DNS can strip or otherwise not use the EDNS0 client subnet extension when making the upstream DNS query. When the DNS response comes back, the intermediary server can apply the client subnet information, and the ping proxy information, to select amongst the given DNS answers (IP addresses) in the DNS response. In this way the enterprise can gain some benefit of client specific mapping without having to expose aspects of its addressing scheme.

Any Modification

The teachings hereof can also apply to any arbitrary modification to the set of data being returned from an authoritative DNS server through an intermediate DNS server, where the modification occurs, to the end user client.

As an example, the IP addresses being returned could all be exchanged by the intermediary DNS server for IP addresses of proxy servers where caching, security, or access controls will be provided.

Alternatively, the intermediary DNS server could use a selection process could to restrict the list of IPs to only servers within specific networks or geographic regions due to compliance issues or data residency requirements. Thus, each IP address in the original DNS response can be analyzed and mapped to a geographic location or country or network, for example, and then removed according to rules installed in the intermediate DNS server.

These and other examples in this document do not restrict generality. This invention can be applied to any type of modification, for any desired reason or outcome.

Any Query Type

The description above focuses on queries involving DNS requests for IP addresses, either IPv4 or IPv6, more specifically referred to as A or AAAA queries in the language of DNS. This invention more broadly can apply to any type of DNS query or any query whatsoever.

For example, SRV queries are commonly used to do service discovery using the DNS system. It is entirely plausible that the invention could be applied to transform the SRV response from the authoritative DNS servers to something more suitable for the end user.

In another example, PTR records are used to determine the hostname associated to an IP address (commonly referred to as a reverse DNS lookup). These responses could be modified by an intermediate DNS server to change the hostnames associated with an IP address.

Again, the given examples in this document should not reflect a loss of generality. This invention can be applied to any type of DNS query, for any desired reason or outcome.

Advantages of Method

Some potential features and advantages that may be attained through practice of the invention are now described. However, it should be understood that it is not necessary to attain any or all of the following advantages in order to practice the invention; these are merely examples of potential effects of practicing the invention.

Among the potential advantages are:

1. For end user clients, the method provides better mapping to any site fronted by a domain that resolves to multiple IP addresses.
2. For end user clients, the method provides better liveness characteristics to any site fronted by a domain that resolves to multiple IP addresses.
3. For end user clients, utilizing this method requires just a DNS configuration change to point to a DNS resolver capable of performing response filtering. e.g. VPN or DHCP configuration to change DNS IP.
4. For third-party websites that already have DNS based mapping systems, the method provides enhanced mapping without the need to transfer authoritative DNS control or configuring a CNAME to another entity such as a CDN.
5. For websites that don't currently utilize DNS based mapping systems but are distributed, the method provides enhanced mapping without the need to transfer authoritative DNS control or configuring a CNAME to another entity.
6. For client side entities with distributed infrastructure, they can provide mapping to desired websites regardless of whether those websites are working with a CDN. This enhances the performance of the client side infrastructure.
7. For carriers and other service providers, the method ensures that there is less network traffic traveling over a longer path to reach a site, which may mean less operational expenditures and less congestion over their platform and the general Internet.

Host and Use Case Applicability

The teachings hereof can be applied to both hosts on a private network as well as hosts on the Internet, regardless of where an endpoint or user is located. We see particular applicability in the following areas:

1. Better performance and user-experience for both home and corporate users.
2. Content providers or Internet infrastructure providers that are looking for alternative methods to either adding or improving mapping. For example, the content provider may not want to utilize a CDN to store and cache content, but would like [enhanced] mapping capabilities.
3. Reduced operational expenditure and enhanced user-experience for ISPs, VPN companies, or corporate networks.
4. Compliance or data residency enforcement. (Remove IP addresses according to rules.)
5. Service modification.
6. Security Injection. For example, the intermediary DNS server could filter out IP addresses that are known or believed to be malicious based on a score returned from an IP reputation service. IP reputation services are known in the art and can provide an indication as to whether a particular IP address has been associated with malicious activity.

7. Proxy Injection For example, the Intermediary DNS server could return to the end user client a substitute IP address. The substitute IP address could point to a proxy server that will perform additional security or performance optimizations for the end user client. The client side entity's policy can specify domains for which this substitution process should take place.

Content Delivery Networks

A description of a CDN is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 8:
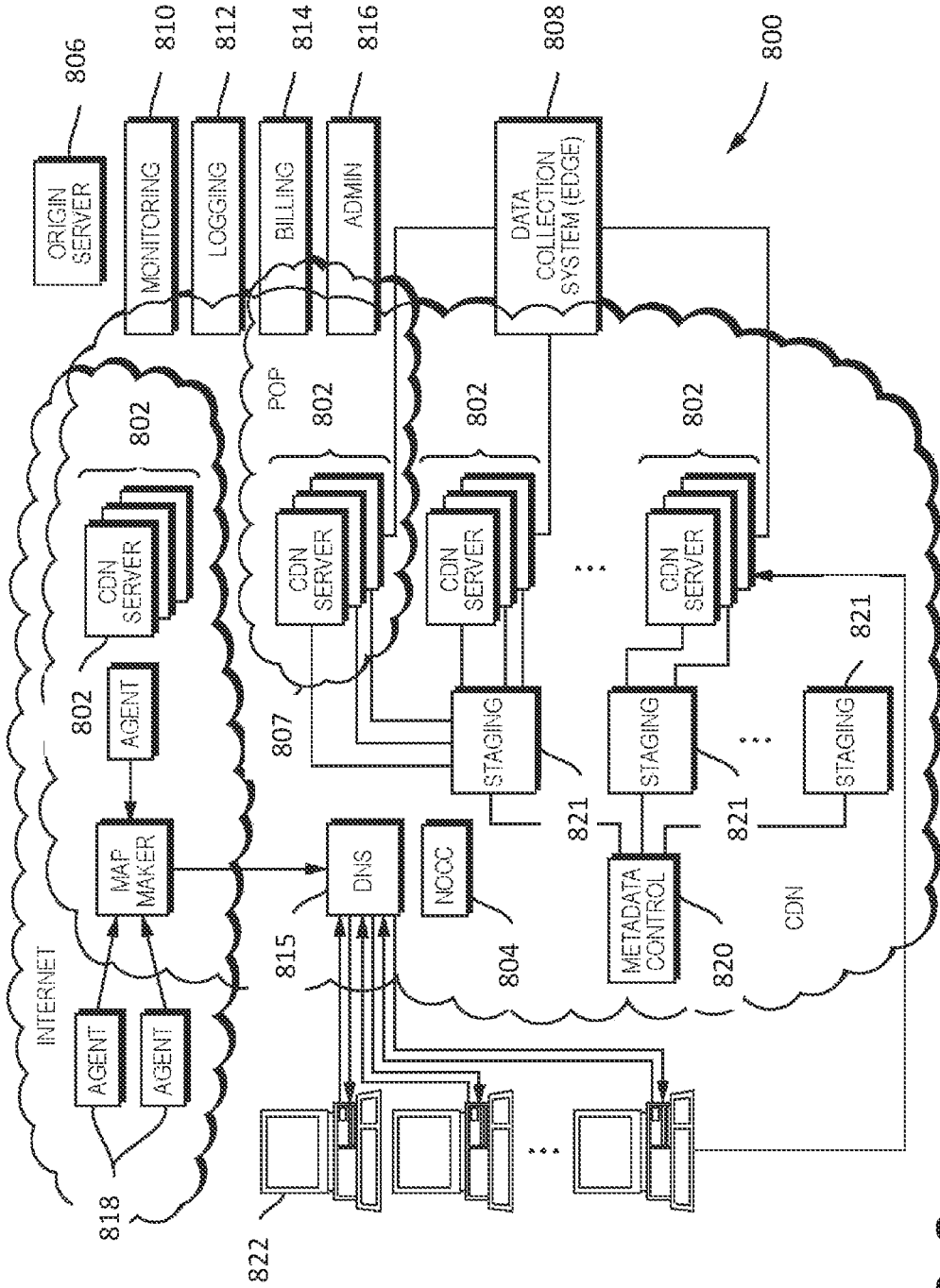
FIG. 8 is a high-level diagram of an embodiment of the content delivery network (CDN) in which the teachings hereof may be implemented; and, FIG. 9 is a block diagram illustrating hardware in a computer system that may be used to implement the teachings hereof.

In a known system such as that shown in FIG. 8, a distributed computer system 800 is configured as a content delivery network (CDN) and is assumed to have a set of machines 802 distributed around the Internet. The machines 802 are servers. Typically, most of the machines are configured as servers and located near the edge of the Internet, i.e., at or adjacent end user access networks. A network operations command center (NOCC) 804 may be used to administer and manage operations of the various machines in the system. Third party sites affiliated with content providers, such as web site 806, offload delivery of content (e.g., HTML or other markup language files, embedded page objects, streaming media, software downloads, and the like) to the distributed computer system 800 and, in particular, to the servers 802 (which are sometimes referred to as content servers, or sometimes as "edge" servers in light of the possibility that they are near an "edge" of the Internet). Such servers may be grouped together into a point of presence (POP) 807.

Typically, content providers offload their content delivery by aliasing (e.g., by a DNS CNAME) given content provider domains or sub-domains to domains that are managed by the service provider's authoritative domain name service. End user client machines 822 that desire such content may be directed to the distributed computer system to obtain that content more reliably and efficiently. The CDN servers respond to the client requests, for example by obtaining requested content from a local cache, from another CDN server, from the origin server 806, or other source. (It should be understood that the origin server 806 is itself a content server, operated by the content provider.)

Although not shown in detail in FIG. 8, the distributed computer system may also include other infrastructure, such as a distributed data collection system 808 that collects usage and other data from the CDN servers, aggregates that data across a region or set of regions, and passes that data to other back-end systems 810, 812, 814 and 816 to facilitate monitoring, logging, alerts, billing, management and other operational and administrative functions. Distributed network agents 818 monitor the network as well as the server loads and provide network, traffic and load data to a DNS query handling mechanism 815, which is authoritative for content domains being managed by the CDN (this corresponds to the authoritative DNS 108 shown in FIG. 1-4). A distributed data transport mechanism 820 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 802 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 9:
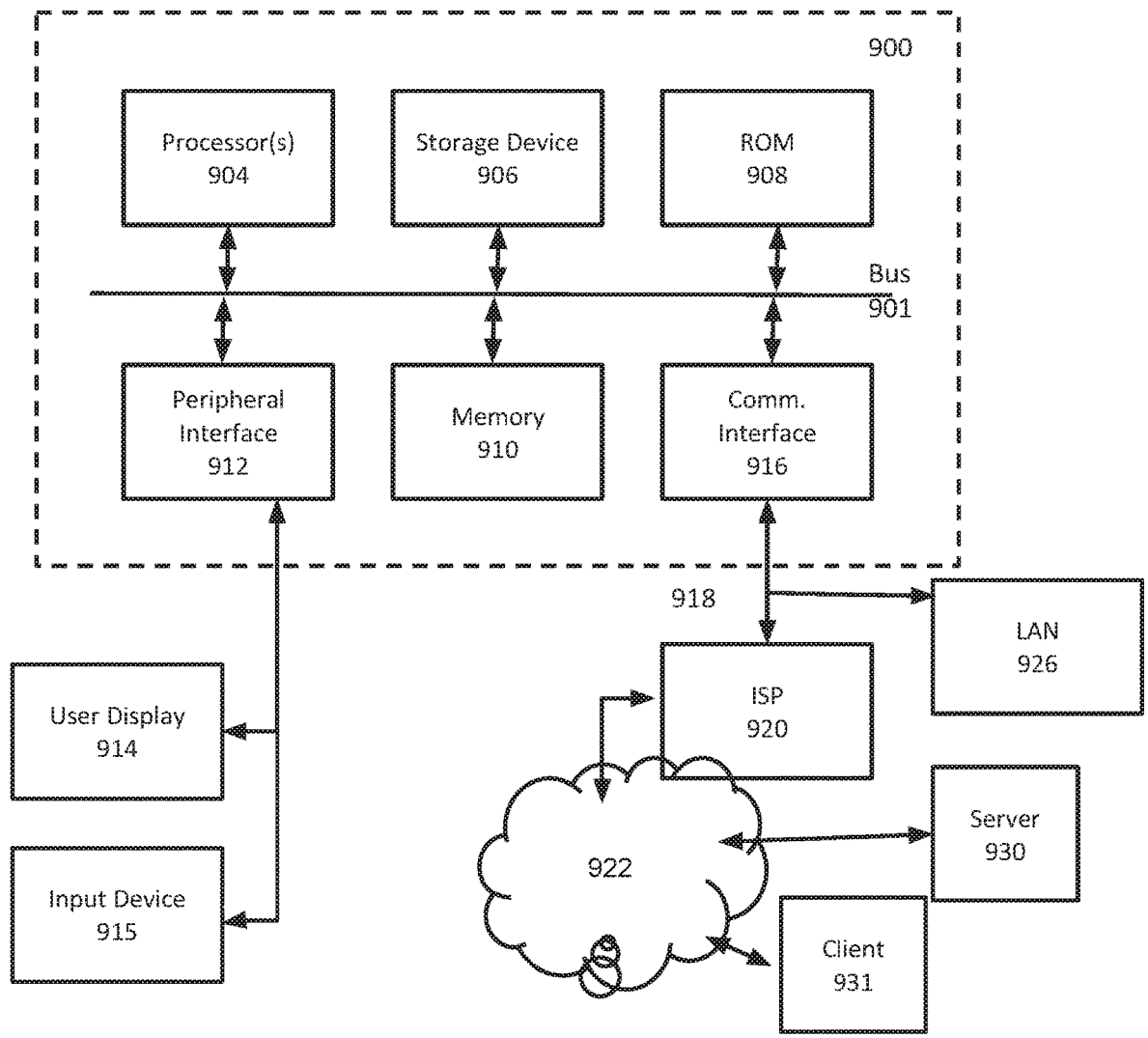

FIG. 9 is a block diagram that illustrates hardware in a computer system 900 upon which such software may run in order to implement embodiments of the invention. The computer system 900 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 900 includes a microprocessor 904 coupled to bus 901. In some systems, multiple processor and/or processor cores may be employed. Computer system 900 further includes a main memory 910, such as a random access memory (RAM) or other storage device, coupled to the bus 901 for storing information and instructions to be executed by processor 904. A read only memory (ROM) 908 is coupled to the bus 901 for storing information and instructions for processor 904. A non-volatile storage device 906, such as a magnetic disk, solid state memory (e.g., flash memory), or optical disk, is provided and coupled to bus 901 for storing information and instructions. Other application-specific integrated circuits (ASICs), field programmable gate arrays (FPGAs) or circuitry may be included in the computer system 900 to perform functions described herein.

A peripheral interface 912 communicatively couples computer system 900 to a user display 914 that displays the output of software executing on the computer system, and an input device 915 (e.g., a keyboard, mouse, trackpad, touchscreen) that communicates user input and instructions to the computer system 900. The peripheral interface 912 may include interface circuitry, control and/or level-shifting logic for local buses Universal Serial Bus (USB), IEEE 1394, or other communication links.

Computer system 900 is coupled to a communication interface 916 that provides a link (e.g., at a physical layer, data link layer) between the system bus 901 and an external communication link. The communication interface 916 provides a network link 918. The communication interface 916 may represent a Ethernet or other network interface card (NIC), a wireless interface, modem, an optical interface, or other kind of input/output interface.

Network link 918 provides data communication through one or more networks to other devices. Such devices include other computer systems that are part of a local area network (LAN) 926. Furthermore, the network link 918 provides a link, via an internet service provider (ISP) 920, to the Internet 922. In turn, the Internet 922 may provide a link to other computing systems such as a remote server 930 and/or a remote client 931. Network link 918 and such networks may transmit data using packet-switched, circuit-switched, or other data-transmission approaches.

In operation, the computer system 900 may implement the functionality described herein as a result of the processor executing code. Such code may be read from or stored on a non-transitory computer-readable medium, such as memory 910, ROM 908, or storage device 906. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 918 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for improving the network performance of an end user client to server connection, comprising:
at an intermediary DNS server operated by any of (i) an enterprise and (ii) a service provider on behalf of the enterprise, the intermediary DNS server configured to recursively resolve domain names for end user clients in the enterprise:
receiving a request to resolve a domain name from an end user client in the enterprise;
in response to receipt of the request to resolve the domain name from the end user client, the intermediary DNS server sending a request to resolve the domain name towards an upstream DNS server, the upstream DNS server being outside of the enterprise, wherein the intermediary DNS server is configured to, in making such request, any of: strip client subnet information for the end user client and not append client subnet information for the end user client;
receiving a DNS response comprising a plurality of IP addresses generated by the upstream DNS server in response to the request to resolve the domain name;
receiving performance measurement data from measured by a ping proxy on behalf of the intermediary DNS server, the ping proxy located in the enterprise, the performance measurement data being associated with one or more IP addresses of the plurality of IP addresses and reflecting performance to the one or more IP addresses from any of: the end user client location and an approximation of the end user location;
modifying the DNS response, said modification being based at least in part on the performance measurement data and the client subnet information, the modification comprising at least one of:
(i) re-ordering the plurality of IP addresses;
(ii) filtering the plurality of IP addresses;
(iii) substituting an IP address for one of the plurality of IP addresses;
sending the modified DNS response towards the end user client.

2. The method of claim 1, wherein the performance measurement data comprises one or more performance measurements of round trip time (RTT).

3. A system for improving the network performance of an end user client to server connection, comprising:
A. an end user client device in the enterprise, the end user client device having circuitry providing one or more processors and a memory device holding computer program instructions to operate the end user client device to:
send a request to resolve a domain name;
receive a modified DNS response to the request from an intermediary DNS server;
B. the intermediary DNS server operated by any of (i) the enterprise and (ii) a service provider on behalf of the enterprise, the intermediary DNS server configured to recursively resolve domain names for end user clients in the enterprise, the intermediary DNS server having circuitry providing one or more processors and a memory device holding computer program instructions to operate the intermediary DNS server to:
receive the request to resolve a domain name from the end user client in the enterprise;
in response to receipt of the request to resolve the domain name from the end user client, the intermediary DNS server sending a request to resolve the domain name towards an authoritative DNS server, the authoritative DNS server being external to the enterprise, wherein the intermediary DNS server is configured to, in making such request, any of: strip client subnet information for the end user client and not append client subnet information for the end user client;
B. the authoritative DNS server having circuitry providing one or more processors and a memory device holding computer program instructions to operate the authoritative DNS server to:
receive the request to resolve the domain name from the intermediary DNS server;
generate and send a DNS response having a plurality of IP addresses associated with the domain name;
wherein each of the plurality of IP addresses is a valid IP address pointing to a live server that is available to serve content hosted under the domain name;

C. the intermediary DNS server having circuitry providing one or more processors and a memory device holding computer program instructions to operate the intermediary DNS server to:
  receive performance measurement data measured by a ping proxy on behalf of the intermediary DNS server, the ping proxy located in the enterprise, the performance measurement data being associated with one or more IP addresses of the plurality of IP addresses and reflecting performance to the one or more IP addresses from any of: the end user client location and an approximation of the end user location;
  modify the DNS response from the authoritative DNS server, said modification being based at least in part on the performance measurement data and the client subnet information, the modification comprising at least one of:
    (i) re-ordering the plurality of IP addresses;
    (ii) filtering the plurality of IP addresses;
    (iii) substituting an IP address for one of the plurality of IP addresses;
  send the modified DNS response towards the end user client.

4. The system of claim 3, wherein the performance measurement data comprises one or more performance measurements of round trip time (RTT).

5. The method of claim 1, wherein the intermediary DNS server any of strips and not appends client subnet information so as to enable the enterprise to avoid exposing aspects of its addressing scheme.

6. The system of claim 3, wherein the intermediary DNS server any of strips and not appends client subnet information so as to enable the enterprise to avoid exposing aspects of its addressing scheme.

* * * * *